(12) United States Patent
Okumura

(10) Patent No.: US 8,290,306 B2
(45) Date of Patent: Oct. 16, 2012

(54) IMAGE PROCESSING METHOD AND IMAGE PROCESSING APPARATUS

(75) Inventor: Ryuichi Okumura, Osaka (JP)

(73) Assignee: Kyocera Document Solutions Inc. (JP)

( * ) Notice: Subject to any disclaimer, the term of this patent is extended or adjusted under 35 U.S.C. 154(b) by 910 days.

(21) Appl. No.: 12/389,596

(22) Filed: Feb. 20, 2009

(65) Prior Publication Data

US 2009/0214125 A1    Aug. 27, 2009

(30) Foreign Application Priority Data

Feb. 26, 2008  (JP) ................................ 2008-044986
Feb. 26, 2008  (JP) ................................ 2008-044987
Feb. 26, 2008  (JP) ................................ 2008-044988

(51) Int. Cl.
*G06K 9/32* (2006.01)
*G06K 9/34* (2006.01)

(52) U.S. Cl. ........................ 382/297; 382/174
(58) Field of Classification Search .................. 382/296, 382/297, 298, 301, 282, 173, 174, 168, 169; 358/488, 451, 453, 464, 465; 345/658
See application file for complete search history.

(56) References Cited

U.S. PATENT DOCUMENTS

| 5,649,033 | A | | 7/1997 | Morikawa et al. |
| 6,137,905 | A | * | 10/2000 | Takaoka ........................ 382/173 |
| 6,473,196 | B2 | * | 10/2002 | Usami et al. ................. 358/1.18 |
| 6,798,905 | B1 | * | 9/2004 | Sugiura et al. ................ 382/168 |

FOREIGN PATENT DOCUMENTS

| JP | H06-103410 | 4/1994 |
| JP | H10-150551 | 2/1998 |
| JP | 2000-113103 | 4/2000 |

\* cited by examiner

*Primary Examiner* — Yon Couso

(57) ABSTRACT

An image processing method has the steps of: scanning respective pages in a document; generating respective pieces of image data corresponding to the pages; identifying respective orientations of isolated images contained by each of the pages according to a result of character recognition for the image data; determining whether or not the isolated images contained by the page have different orientations; assigning respective ones of the isolated images to new pages; and setting respective orientations of the isolated images in the new pages as respective upright orientations of the isolated images.

9 Claims, 11 Drawing Sheets

FIG. 5
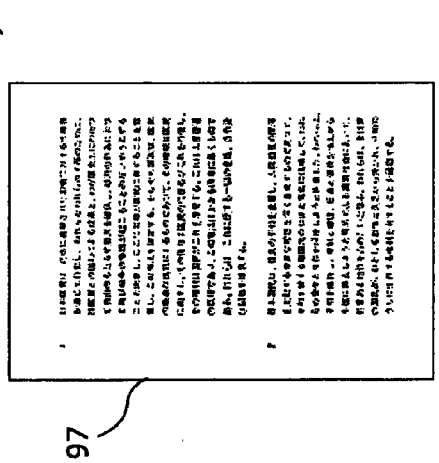
AFTER SEPARATION
(THERE ARE NOT ISOLATED IMAGES IN DIFFERENT DIRECTIONS)
PAGE 1 AND PAGE 2
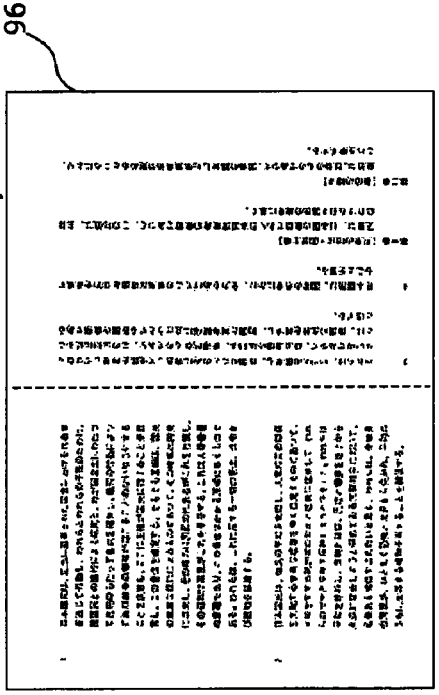
BEFORE SEPARATION
(THERE ARE ISOLATED IMAGES IN DIFFERENT DIRECTIONS)
PAGE 1-2
PAGE 1-1

FIG. 9
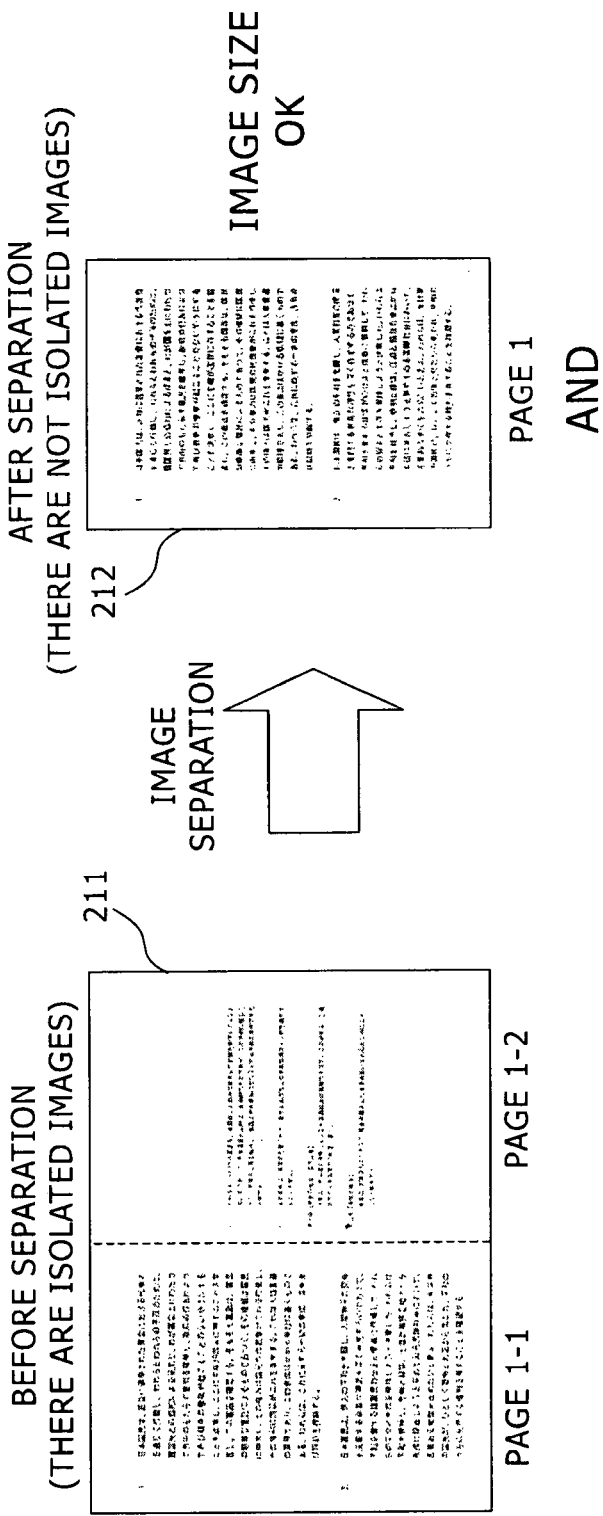
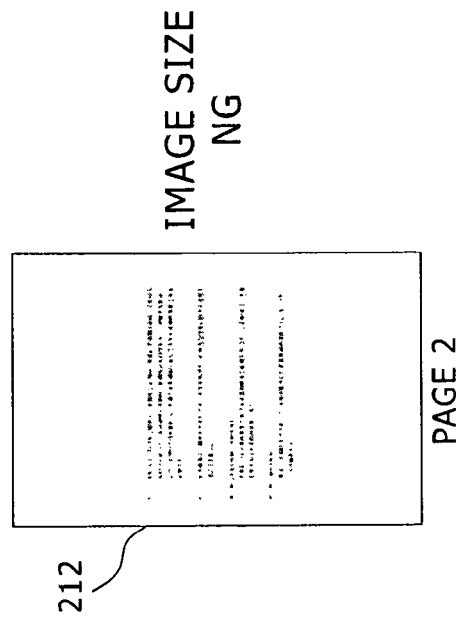

FIG. 11
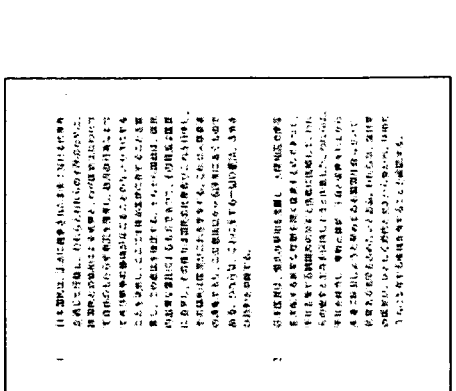
AFTER SEPARATION
(THERE ARE NOT ISOLATED IMAGES
AFTER ENLARGEMENT
AND UPRIGHT MODIFICATION)
232
PAGE 1
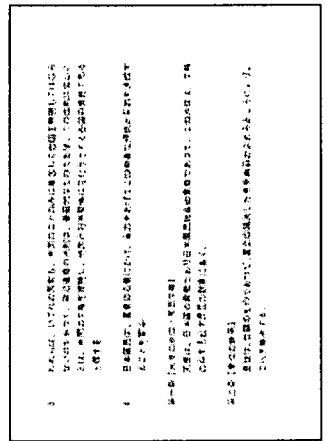
AND
232
PAGE 2
SPARATION,
ENLARGEMENT, AND
UPRIGHT MODIFICATION
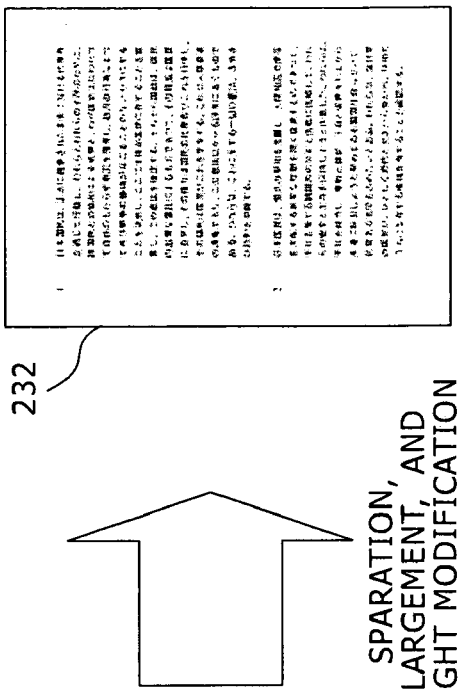
231
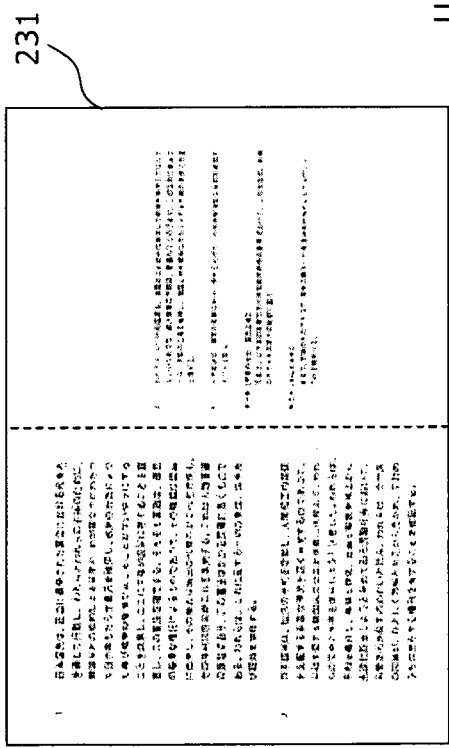
BEFORE SEPARATION
(THERE ARE ISOLATED IMAGES)
PAGE 1-2
PAGE 1-1

IMAGE PROCESSING METHOD AND IMAGE PROCESSING APPARATUS

CROSS-REFERENCE TO RELATED APPLICATIONS

This application relates to and claims priority rights from Japanese Patent Applications:
No. 2008-044986, filed on Feb. 26, 2008,
No. 2008-044987, filed on Feb. 26, 2008, and
No. 2008-044988, filed on Feb. 26, 2008, the entire disclosures of which are hereby incorporated by reference herein.

BACKGROUND OF THE INVENTION

1. Field of the Invention

This invention relates to image processing method and image processing apparatus.

2. Description of the Related Art

An electronic document has pluralities of pages that include document images. If all the document images have been arranged in the upright orientation, then they are easy to see when a user browses the electronic document.

To satisfy such need, in a known image processing technique (Technique 1), image data is received by a facsimile transmitting-receiving unit, and stored in a memory, and an orientation identifying unit identifies the orientation of an image based on the image data, and transmits the image data with information on the identified orientation to a computer, and the computer arranges document images based on the image data in the upright orientation according to the information, and displays the document images. Therefore user's works are saved.

In another known technique (Technique 2), the orientation of a document image is detected as any of 0, 90, 180 and 270 degrees from a result of character recognition, and to identify the orientation accurately, if two or more orientations are estimated for a character in the document image, then the character is less taken into account to detect the orientation of the whole document image.

SUMMARY OF THE INVENTION

In general, image processing apparatuses such as digital copier can perform page aggregation such as "2 in 1" or "4 in 1" by reducing document images of pluralities of pages and aggregating the reduced images into a page.

An electronic document generated using page aggregation from pluralities of pages sometimes has a document image arranged in the vertical orientation and a document image arranged in the horizontal orientation. Although these document images are originally isolated from each other, both document images may be aggregated into a page, and consequently, both document images that have different orientations are sometimes arranged in a page. When the aforementioned techniques Technique 1 and Technique 2 are performed for a page that contains a page aggregation image generated from document images in different orientations, the orientation of the page aggregation image is changed to be vertical or horizontal. As a result, even after changing the orientation, the page aggregation image still has document images arranged in different orientations. Therefore, the page aggregation image is still not easy to see.

An objective of this invention is to provide an image processing method and an image processing apparatus capable of modifying different orientations of isolated document images in a page of an electronic document (i.e. not easy to read) to their upright orientations.

Further, an electronic document generated using page aggregation from pluralities of pages sometimes has a document image arranged in the vertical orientation and a document image arranged in the horizontal orientation. Although these document images are originally isolated from each other, both document images may be aggregated into a page as isolated images, and the isolated image may be very small in the page. Consequently, the small isolated image is not easy to see. In general, before page aggregation, all of page images are made the same size and orientation. However, the aforementioned situation may occur when one of the page images has been rotated from horizontal to vertical and reduced to fit into a horizontal image area at a reduction ratio higher than that for other page images according to the sizes and the orientations of page images (Technique 3). When Technique 3 is performed, an electronic document may have a page aggregation image that contains the small isolated image not easy to see. Even if the aforementioned techniques Technique 1 and Technique 2 are performed for the page aggregation image that contains the small isolated image, the page aggregation image still contains the small isolated image. Therefore, the page aggregation image is still not easy to see.

Another objective of this invention is to provide an image processing method and an image processing apparatus capable of providing a conformable browsing environment for an electronic document by saving user's work even if the electronic document is made using page aggregation, and contains a small isolated image not easy to see.

The present invention solves these subjects as follows.

An image processing method according to the first aspect of this invention has the steps of:
scanning respective pages in a document;
generating respective pieces of image data corresponding to the pages;
identifying respective orientations of isolated images contained by each of the pages according to a result of character recognition for the image data;
determining whether or not the isolated images contained by the page have different orientations;
assigning respective ones of the isolated images to new pages; and
setting respective orientations of the isolated images in the new pages as respective upright orientations of the isolated images.

An image processing apparatus according to the second aspect of this invention has:
a document scanning unit that scans respective pages in a document;
an image data generating unit that generates respective pieces of image data corresponding to the pages;
an image orientation identifying unit that identifies respective orientations of isolated images contained by each of the pages according to a result of character recognition for the image data;
a mixture state identifying unit that identifies a mixture state that indicates whether or not the isolated images contained by the page have different orientations;
an isolated-image separating unit that assigns respective ones of the isolated images to new pages according to the mixture state; and
an image orientation modifying unit that sets respective orientations of the isolated images in the new pages as upright orientations of the isolated images.

An image processing method according to the third aspect of this invention has the steps of:

scanning respective pages in a document;

generating respective pieces of image data corresponding to the pages;

calculating image density distributions in a primary scan direction and a secondary scan direction in each of the pages from the image data;

determining whether or not each of the pages contains isolated images that have different orientations according to the image density distributions;

assigning respective ones of the isolated images to new pages;

identifying respective orientations of the isolated images according to a result of character recognition for the image data; and setting respective orientations of the isolated images in the new pages as respective upright orientations of the isolated images.

An image processing apparatus according to the fourth aspect of this invention has:

a document scanning unit that scans respective pages in a document;

an image data generating unit that generates respective pieces of image data corresponding to the pages;

an image density distribution calculating unit that calculates image density distributions in a primary scan direction and a secondary scan direction in each of the pages from the image data;

a mixture state identifying unit that identifies a mixture state from the image density distributions, the mixture state indicating whether or not each of the pages contains isolated images that have different orientations;

an isolated-image separating unit that assigns respective ones of the isolated images to new pages according to the mixture state;

an image orientation identifying unit that identifies respective orientations of the isolated images according to a result of character recognition for the image data; and an image orientation modifying unit that sets respective orientations of the isolated images in the new pages as upright orientations of the isolated images.

By any of the first to fourth aspects, it is possible to modify different orientations of isolated document images in a page of an electronic document (i.e. not easy to read) to their upright orientations.

An image processing method according to the fifth aspect of this invention has the steps of:

scanning respective pages in a document;

generating respective pieces of image data corresponding to the pages;

calculating image density distributions in a primary scan direction and a secondary scan direction in each of the pages from the image data;

determining whether or not each of the pages contains isolated images from the image density distributions;

assigning respective ones of the isolated images to new pages;

identifying sizes of the isolated images from the image density distributions;

identifying respective orientations of the isolated images according to a result of character recognition for the image data;

setting respective orientations of the isolated images in the new pages as respective upright orientations of the isolated images; and enlarging the isolated images in the new pages according to the sizes of the isolated images.

An image processing apparatus according to the sixth aspect of this invention has:

a document scanning unit that scans respective pages in a document;

an image data generating unit that generates respective pieces of image data corresponding to the pages;

an image density distribution calculating unit that calculates image density distributions in a primary scan direction and a secondary scan direction in each of the pages from the image data;

a mixture state identifying unit that identifies a mixture state from the image density distributions, the mixture state indicating whether or not each of the pages contains isolated images;

an isolated-image separating unit that assigns respective ones of the isolated images to new pages according to the mixture state;

an image size identifying unit that identifies sizes of the isolated images from the image density distributions; an image orientation identifying unit that identifies respective orientations of the isolated images according to a result of character recognition for the image data; and an image modifying unit that sets respective orientations of the isolated images in the new pages as upright orientations of the isolated images, and enlarges the isolated images in the new pages according to the sizes of the isolated images.

By the fifth or the sixth aspect, it is possible to provide a conformable browsing environment for an electronic document by saving user's work even if the electronic document is made using page aggregation and contains the small isolated image not easy to see.

These and other objects, features and advantages of the present invention will become more apparent upon reading of the following detailed description along with the accompanied drawings.

BRIEF DESCRIPTION OF THE DRAWINGS

FIG. 5 shows a diagram for explaining separation and orientation modification of the isolated images in different orientations, based on a blank area in the aggregated document page in Embodiment 1;

FIG. 9 shows a diagram for explaining separation and orientation modification of the isolated images, based on a blank area in the aggregated document page in Embodiment 2;

FIG. 11 shows a diagram for explaining separation, enlargement and orientation modification of the aggregated document page in Embodiment 2.

DETAILED DESCRIPTION OF THE PREFERRED EMBODIMENT

Hereinafter, image processing methods and image processing apparatuses according to embodiments of this invention are explained in detail with referencing to drawings. Digital multi function peripherals are explained as examples of image processing apparatuses according to this invention.
Embodiment 1.
[A Schematic Configuration of a Digital Multi Function Peripheral According to Embodiment 1]

Figure 1:
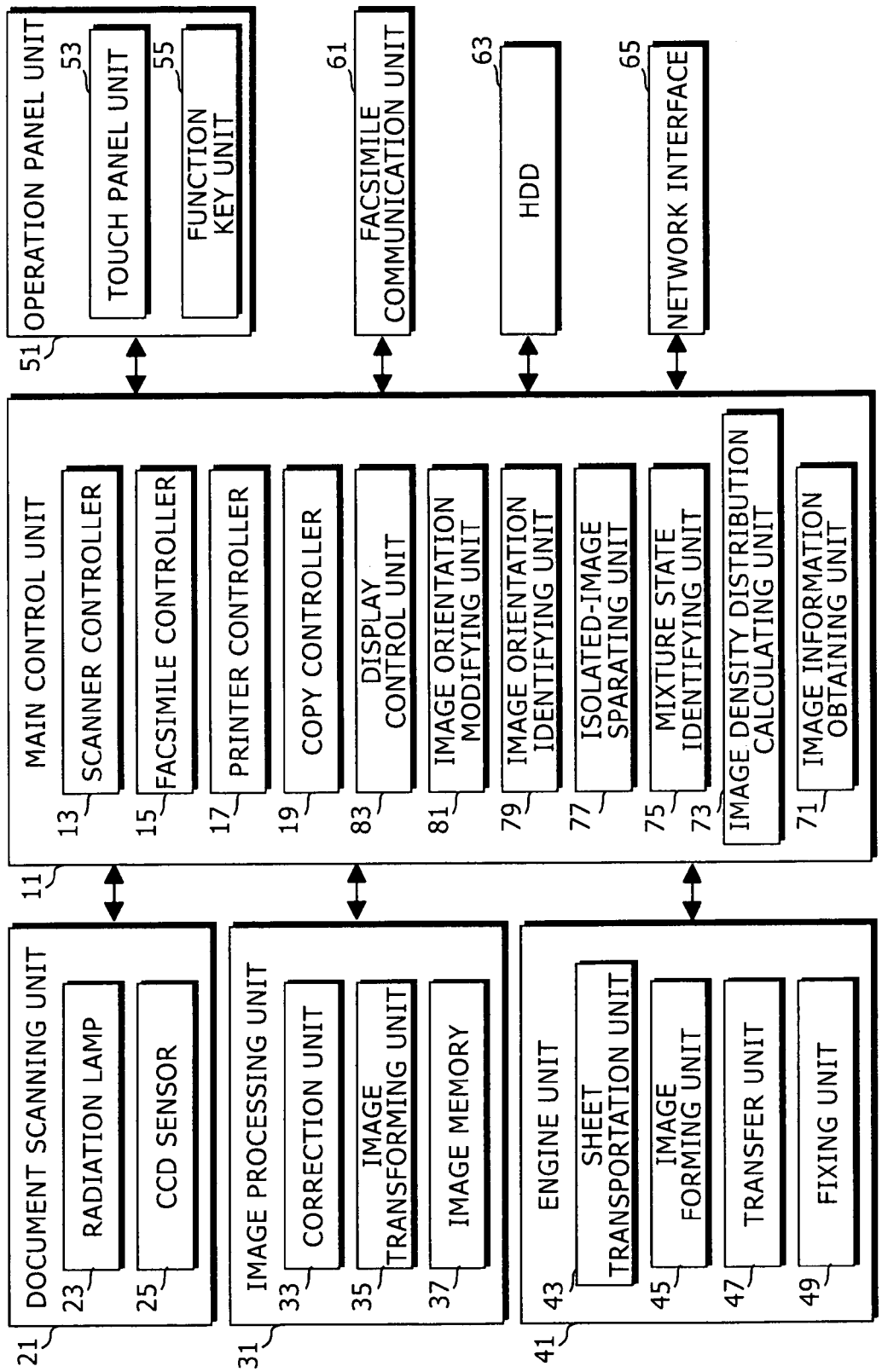
FIG. 1 shows a functional block diagram that indicates a schematic configuration of a digital multi function peripheral according to Embodiment 1 of this invention.
Figure 2:
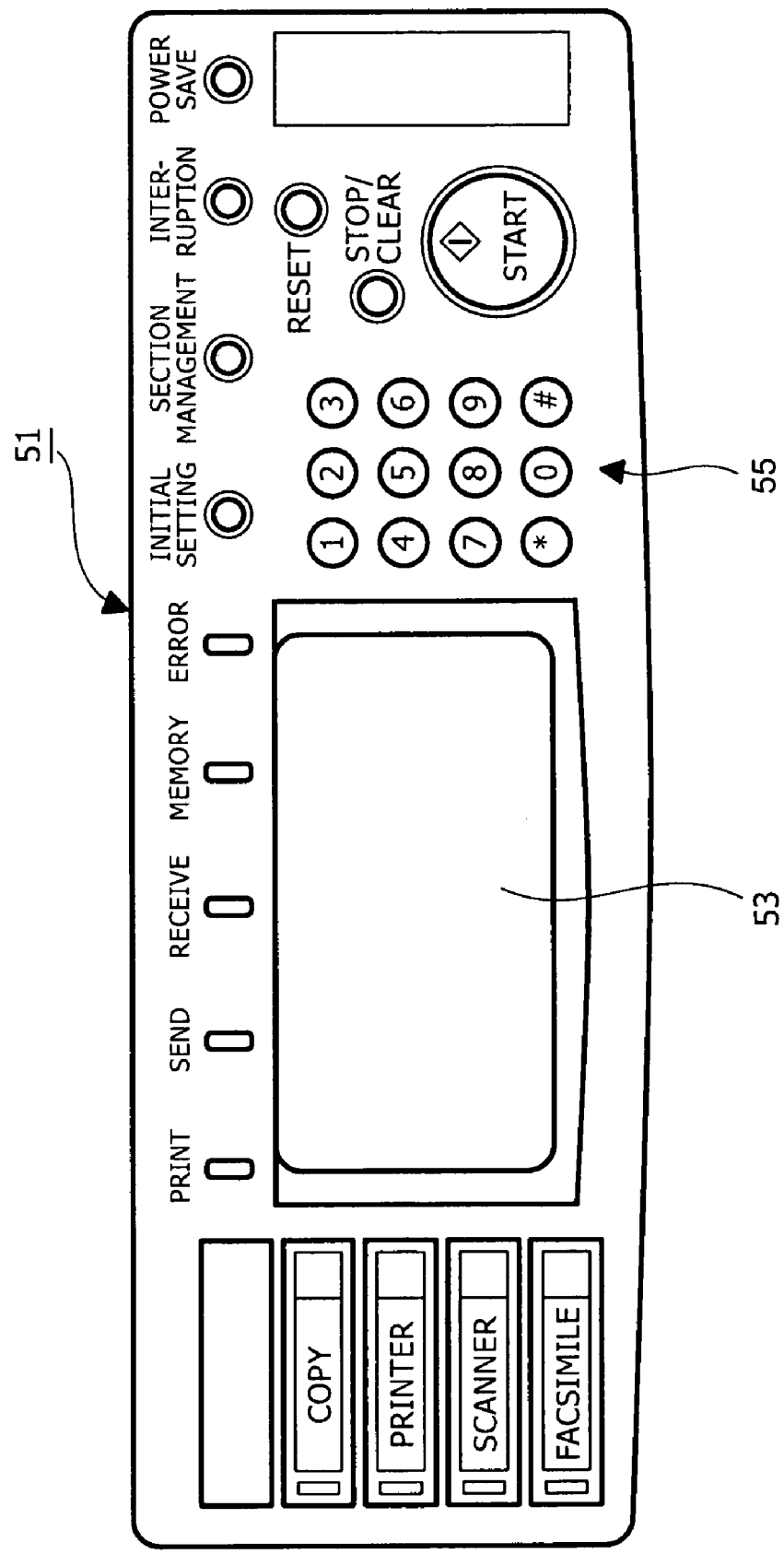
FIG. 2 shows a diagram that indicates an exterior view of an operation panel unit in the digital multi function peripheral according to Embodiment 1 of this invention.

FIG. 1 shows a functional block diagram that indicates a schematic configuration of the digital multi function peripheral. FIG. 2 shows a diagram that indicates an exterior view of an operation panel unit in the digital multi function peripheral.

This apparatus has functions capable of executing a copy job, a facsimile transmission job, a print job, a network transmission job (email transmission or data transmission), and is controlled by a main control unit 11 that contains a microcomputer, a specific-purpose hardware circuit and so on.

To carry out the functions, this apparatus contains a document scanning unit 21, an image processing unit 31, an engine unit 41, an operation panel unit 51, a facsimile communication unit 61, a hard disk drive (HDD) 63, and a network interface unit 65 as devices connected to the main control unit 11.

The main control unit 11 contains a scan controller 13, a facsimile controller 15, a printer controller 17, and a copy controller 19, and controls operations of this apparatus as a whole. The scan controller 13 controls a scanner function. The facsimile controller 15 controls a facsimile controller. The printer controller 17 controls a printer function. The copy controller 19 controls a copy function.

The document scanning unit 21 contains a scanner (not shown). This scanner has a radiation lamp 23 and a Charge Coupled Device (CCD) sensor 25. The document scanning unit 21 scans a document to generate image data corresponding to the document, and outputs the image data to the image processing unit 31. In the document scanning unit 21, the radiation lamp 23 radiates light to the document, and the CCD sensor 25 receives reflection light from the document. The document scanning unit 21 scans respective pages in a document. The document scanning unit 21 is an instance of the document scanning unit.

The image processing unit 31 contains a correction unit 33, an image transforming unit 35, and an image memory 37. As necessary, using the correction unit 33 and/or the image transforming unit 35, the image processing unit 31 processes the image data generated by the document scanning unit 21. The image processing unit 31 stores the processed image data to the image memory 37, and/or outputs the image data to the engine unit 41, the facsimile communication unit 61, or the like. The correction unit 33 performs predetermined correction processes such as level correction and gamma correction for the image data generated by the document scanning unit 21. The image transforming unit 35 performs transformation processes such as data compression, data decompression, image enlargement and image reduction for the image data generated by the document scanning unit 21.

The engine unit 41 contains a sheet transportation unit 43, an image forming unit 45, a transfer unit 47, and a fixing unit 49. The sheet transportation unit 43 contains a paper cassette, a paper feeding roller, and so on (not shown). The image forming unit 45 contains a photoconductor drum, an exposing device, a developing device, and so on (not shown). The transfer unit 47 contains a transfer roller, and so on (not shown). The fixing unit 49 contains a fixing roller, and so on (not shown). The engine unit 41 prints an image on a sheet based on the image data generated by the document scanning unit 21, the image data received by the network interface unit 65 via a LAN (Local Area Network) from a client PC (personal computer) or the like, or the image data generated from facsimile data received by the facsimile communication unit 61 from another facsimile machine. Specifically, the sheet transportation unit 43 transports a sheet to the image forming unit 45, and the transfer unit 47 transfers a toner image onto the sheet, and the fixing unit 49 fixes the toner image on the sheet, and consequently, the image is formed and printed.

The operation panel unit 51 contains a touch panel unit 53 and a function key unit 55, as shown in FIGS. 1 and 2. The operation panel unit 51 is used for receiving user operations on a scanner function, a facsimile function, a printer function, a copy function, and so on, and notifies the main control unit 11 of the user operations, and so on.

The touch panel unit 53 contains a set of a touch panel and a color LCD (Liquid Crystal Display) to display various setting screens. For example, when the copy function is performed, the touch panel unit 53 displays information necessary to set a document size, a copy size, a number of copies to be printed, and so on, and displays buttons or the like to receive various instructions due to user's touches. Further, the touch panel unit 53 displays an electronic document that contains document images of pages. The touch panel unit 53 is an instance of the display unit.

The function key unit 55 has function keys and shortcut keys to be operated when a user chooses a function from functions of image forming process. For example, this is used when a user chooses a function from the copy function, the printer function, the scanner function, the facsimile function, and so on, or when a user inputs a number of copies to be printed, a copy execution instruction, and so on.

The facsimile communication unit 61 contains a coding/decoding unit (not shown), a modulation/demodulation unit (not shown), and an NCU (Network Control Unit) (not shown). The facsimile communication unit 61 transmits image data generated from a document by the document scanning unit 21 via a telephone communication channel to a facsimile machine or the like, and receives image data transmitted from a facsimile machine or the like.

The HDD (Hard Disk Drive) 63 stores image data generated from a document by the document scanning unit 21, and other data such as information on an output format set to the image data. The image data is not only stored in the HDD 63 of the digital multi function peripheral to be used by a program and to be recorded in a recording medium, but also accessed via the network interface unit 65 by a client PC or the like, and transmitted to a folder in a client PC, FTP server, or the like.

The network interface unit 65 controls data transmission and data reception to and from a user terminal (not shown) such as client PC connected via a LAN according to a network interface standard (e.g. 10/100 Base-TX).

Further, the main control unit 11 has an image information obtaining unit 71, an image density distribution calculating unit 73, a mixture state identifying unit 75, an isolated-image separating unit 77, an image orientation identifying unit 79, an image orientation modifying unit 81, and a display control unit 83.

The image information obtaining unit 71 obtains respective pieces of image data of pages in a document scanned in turn by the document scanning unit 21.

The image density distribution calculating unit 73 calculates image density distributions in a primary scan direction and a secondary scan direction from the image data obtained by the image information obtaining unit 71.

The mixture state identifying unit 75 obtains an isolated-image mixture state based on either image orientations obtained by the image orientation identifying unit 79, or the image density distributions obtained by the image density distribution calculating unit 73. The mixture state indicates whether or not isolated images in different orientations are contained in each of the pages.

The isolated-image separating unit 77 assigns the isolated images to new pages according to the mixture state identified by the mixture state identifying unit 75.

The image orientation identifying unit 79 identifies orientations of the isolated images in each of the pages from a result of character recognition performed for the image data obtained by the image information obtaining unit 71.

The image orientation modifying unit 81 sets orientations of the isolated images in the new pages as their respective upright orientations according to the orientations identified by the image orientation identifying unit 79.

The display control unit 83 causes the touch panel unit 53 to display an image.

[Operation of the Digital Multi Function Peripheral (i.e. Image Forming Apparatus) in Embodiment 1]

Figure 3:
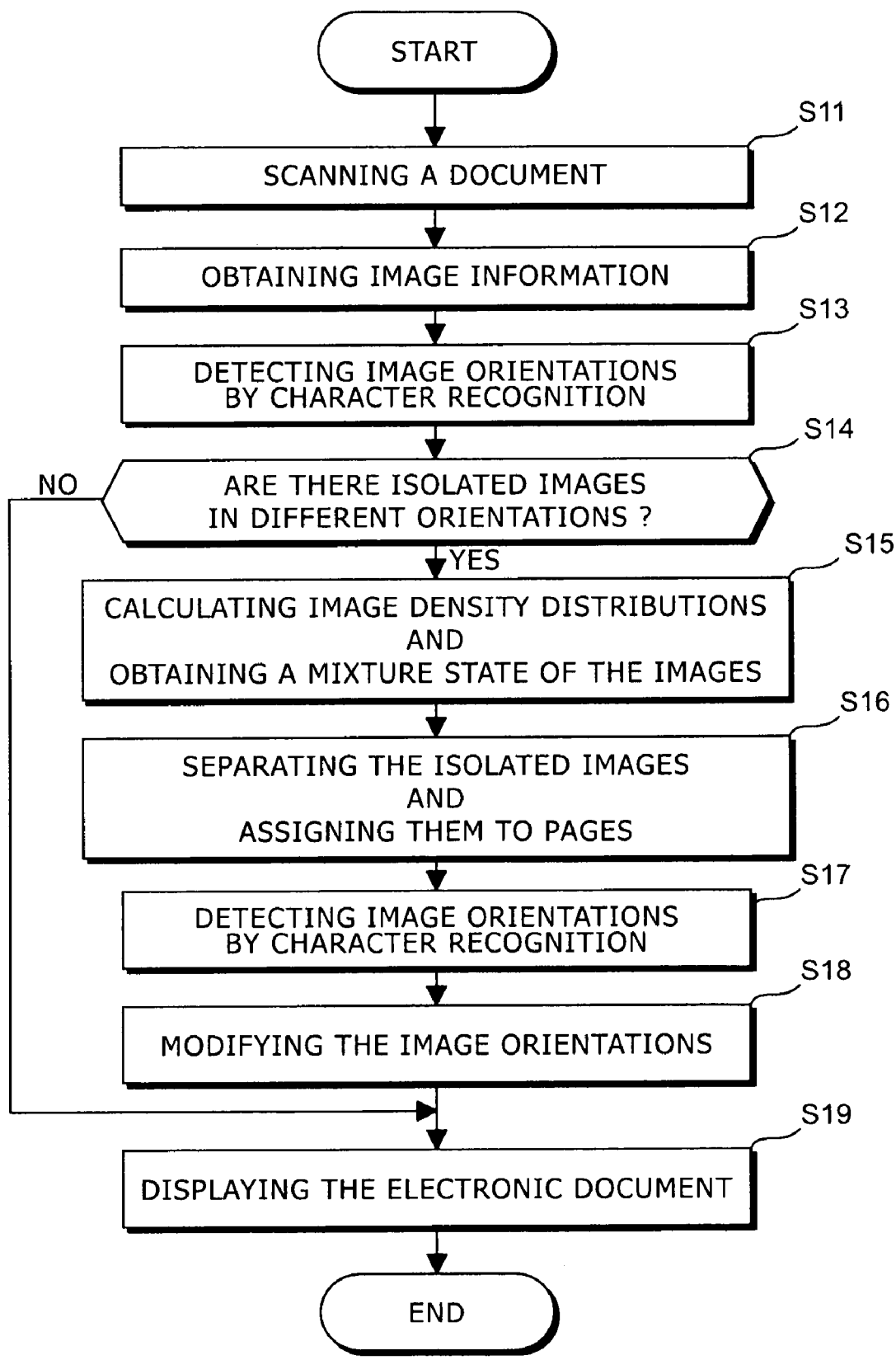
FIG. 3 shows a flowchart that indicates operations of the digital multi function peripheral according to Embodiment 1 of this invention.
Figure 4:
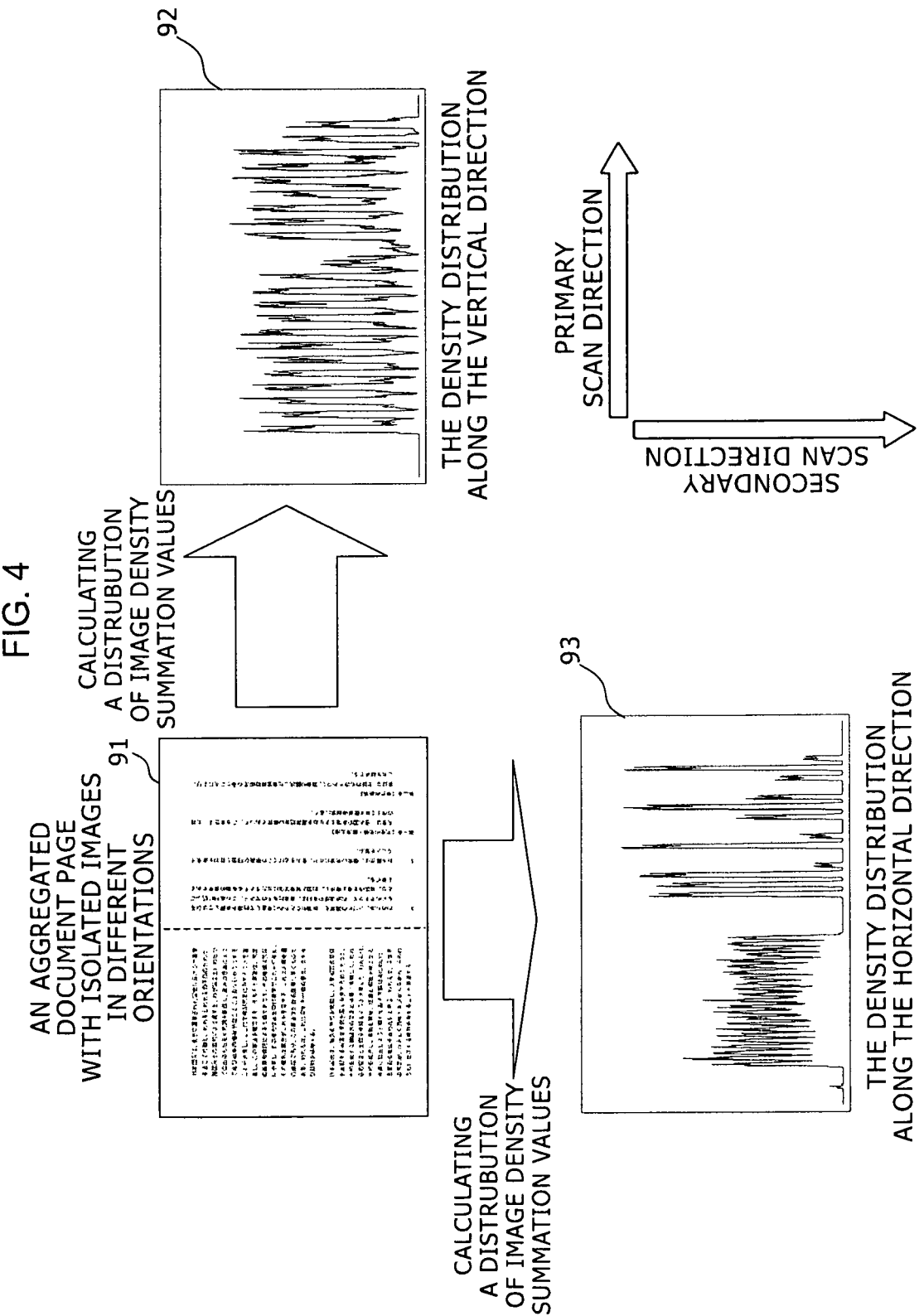
FIG. 4 shows a diagram for explaining image density distributions of an aggregated document page that contains isolated images in different orientations.

In the following part, operation of the digital multi function peripheral in Embodiment 1 is explained with referencing to FIGS. 3 to 5. FIG. 3 shows a flowchart of operation of this digital multi function peripheral. FIG. 4 shows a diagram for explaining image density distributions of an aggregated document page that contains isolated images arranged in different orientations. FIG. 5 shows a diagram for explaining separation and orientation modification performed for the isolated images in different orientations, based on a blank area in the aggregated document page in Embodiment 1.

Here, it is assumed that the digital multi function peripheral of Embodiment 1 has a page aggregation function, and an electronic document generation function for generating an electronic document that has document images of pages by using the page aggregation function.

As shown in FIG. 3, a user puts a document with pluralities of pages on an auto document feeder (not shown) in the document scanning unit 21, and operates the operation panel unit 51 to input an instruction for scanning the document, and then the main control unit 11 provides a start signal to the document scanning unit 21 to start scanning. Upon receiving the signal, the document scanning unit 21 starts scanning respective ones of the pages in the document (Step S11).

The document scanning unit 21 provides respective pieces of image data corresponding to respective ones of the pages scanned in Step S11 to the image information obtaining unit 71. The image information obtaining unit 71 receives the pieces of the image data corresponding to the pages of the document, and stores the image data in the image memory 37 (Step S12).

The image processing unit 31 performs a character recognition process for the image data obtained in Step S12, and provides a result of the character recognition process to the image orientation identifying unit 79. The image orientation identifying unit 79 identifies orientations of isolated images in each of the pages from the result of the character recognition process for the image data obtained in Step S12 (Step S13). Each of the orientations is identified as any of 0, 90, 180 and 270 degrees.

The mixture state identifying unit 75 identifies a mixture state of the isolated images in different orientations contained by each of the pages. Specifically, for each of the pages, the mixture state identifying unit 75 performs an initial determination of whether or not the isolated images in different orientations are contained (Step S14).

If the initial determination in Step S14 results in the determination that the isolated images in different orientations are not contained by one of the pages, then for the page, processes in Steps S15 to S18 are skipped.

Otherwise, if the initial determination in Step S14 results in the determination that the isolated images in different orientations are contained by one of the pages, then for the page, the image density distribution calculating unit 73 calculates image density distributions in a primary scan direction and a secondary scan direction from the image data obtained by the image information obtaining unit 71. For the page, the mixture state identifying unit 75 identifies a mixture state from the image density distributions calculated by the image density distribution calculating unit 73 (Step S15). The mixture state indicates whether or not the page contains the isolated images arranged in different orientations.

Here, calculating the image density distributions and identifying the mixture state in Step S15 are explained in detail with an example of an aggregated document page that contains isolated images arranged in different orientations. An aggregated document page 91 in FIG. 4 contains a horizontal text in the upright orientation in the left half of the page, and a tilted horizontal text not in the upright orientation in the right half of the page. The image density distribution calculating unit 73 calculates respective summation values of image density for rows along the primary scan direction of the page, and obtains the image density distribution 92 in the secondary scan direction by arranging these summation values along the secondary scan direction. The image density distribution calculating unit 73 also calculates respective summation values of image density for columns in the secondary scan direction of the page, and obtains the image density distribution 93 in the primary scan direction by arranging these summation values along the primary scan direction. Analyzing characteristics of the image density distributions, it is found that the distribution 92 in the secondary scan direction (i.e. the vertical direction of the aggregated document page 91) has significant summation values in most of all range, but the distribution 93 in the primary scan direction (i.e. the horizontal direction of the aggregated document page 91) has a blank gap larger than a predetermined width at the center of the page. This blank gap means that the aggregated document page 91 contains a blank area. Therefore, taking into account this blank gap and the result of initial determination that the page contains isolated images in different orientations, it is found that the page 91 contains at least two isolated images in different orientations on both sides of the blank area. Thus, the mixture state identifying unit 75 identifies the mixture state by analyzing the image density distributions in the primary scan direction and the secondary scan direction. The mixture state indicates that how many isolated images in different orientations the aggregated document page 91 contains.

The isolated-image separating unit 77 separates the isolated images from a whole page image of the aggregated document page according to the mixture state identified by the mixture state identifying unit 75, and assigns the isolated images to new pages, respectively (Step S16).

In another instance, Steps S14 and S15 may be omitted. In the case that Steps S14 and S15 are omitted, immediately after identifying the image orientations in Step S13, the image separation and the page assignment in Step S16 are performed. That is, after identifying the image orientations in Step S13, the isolated-image separating unit 77 performs the aforementioned process of Step S16 according to the image orientations identified by the image orientation identifying unit 79. For example, if it is estimated that the page contains the isolated images in different orientations according to the result of identifying the orientation by the image orientation identifying unit 79 (e.g. if the probability is equal to or greater than a changeable threshold such as 50 percents), then the page is divided into two isolated images, and the two isolated images are assigned to new two pages, respectively. Here, if the page is a vertical document page, then the page is divided at a horizontal boundary line into two images. Otherwise, if the page is a horizontal document page, then the page is divided at a vertical boundary line into two images.

After performing the image separation and the page assignment in Step S16, the image orientation identifying unit 79 identifies respective orientations of the separated isolated images from a result of character recognition for respective ones of the separated isolated images (Step S17). Each of the orientations is identified as any of 0, 90, 180 and 270 degrees. The image separation, the page assignment, and the image orientation identification in Steps S16 and S17 are repeatedly performed for each of the isolated images in the page according to a result of identifying the image orientations by the image orientation identifying unit 79 until all the isolated images are processed.

The image orientation modifying unit 81 sets orientations of the isolated images in the new pages as their upright orientations, respectively (Step S18), and provides the electronic document that has been processed as mentioned above to the display control unit 83. The display control unit 83 causes the touch panel unit 53 to display images in the electronic document. Consequently, a series of the processes ends.

In FIG. 5, by separating and placing the isolated images in their upright orientation in Step S18, an aggregated document page 96 is converted to document pages 97 that contain the isolated images, respectively. The aggregated document page 96 has a horizontal text in the upright orientation in the left half of the page as Page 1-1, and a tilted horizontal text not in the upright orientation in the right half of the page as Page 1-2. The first page (i.e. Page 1) of the document pages 97 is a vertical page, and has one of the isolated images that contains a horizontal text in the upright orientation. The second page (i.e. Page 2) of the document pages 97 is a horizontal page, and has the other of the isolated images that contains a horizontal text in the upright orientation.

[Advantages of Embodiment 1]

As mentioned above, in Embodiment 1, orientations of images contained by each of pages in a scanned document are identified from a result of character recognition based on image data of the page; it is determined whether or not the page contains the isolated images in different orientations according to the identified orientations of the images; if the page contains the isolated images, then the isolated images are assigned to new pages, respectively; and orientations of the isolated images in the new pages are set as their upright orientation. Consequently, even if an electronic document generated by page aggregation contains isolated images in different orientations, when a user browses the electronic document, the user is not required to operate for changing an image orientation because of the different orientations of the isolated images. Therefore, the user can comfortably browse the electronic document.

Embodiment 2.

[A Schematic Configuration of a Digital Multi Function Peripheral According to Embodiment 2]

Figure 6:
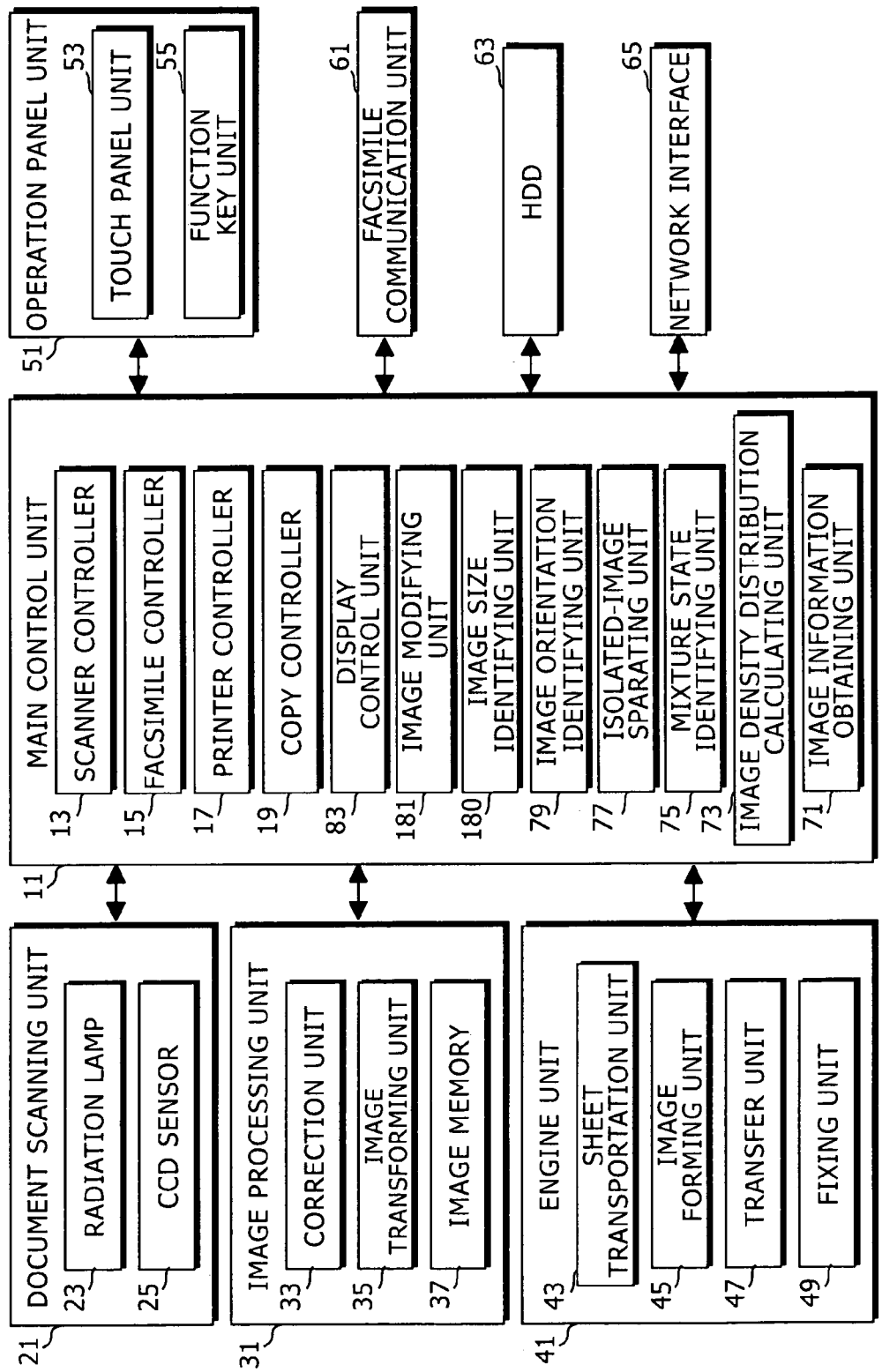
FIG. 6 shows a functional block diagram that indicates a schematic configuration of a digital multi function peripheral according to Embodiment 2 of this invention.

FIG. 6 shows a block diagram that indicates a schematic configuration of the digital multi function peripheral.

In FIG. 6, components other than the main control unit 11 are identical to those in Embodiment 1, and therefore those components are not explained here.

The main control unit 11 has an image size identifying unit 180, and an image modifying unit 181.

The image size identifying unit 180 identifies sizes of the isolated images in the page from the image density distributions calculated by the image density distribution calculating unit 73.

The image modifying unit 181 enlarges the isolated images in the new pages, and sets orientations of the isolated images in the new pages as their upright orientations according to the sizes and the orientations of the isolated images identified by the image size identifying unit 180 and the image orientation identifying unit 79.

[Operation of the digital multi function peripheral (i.e. image forming apparatus) in Embodiment 2]

Figure 7:
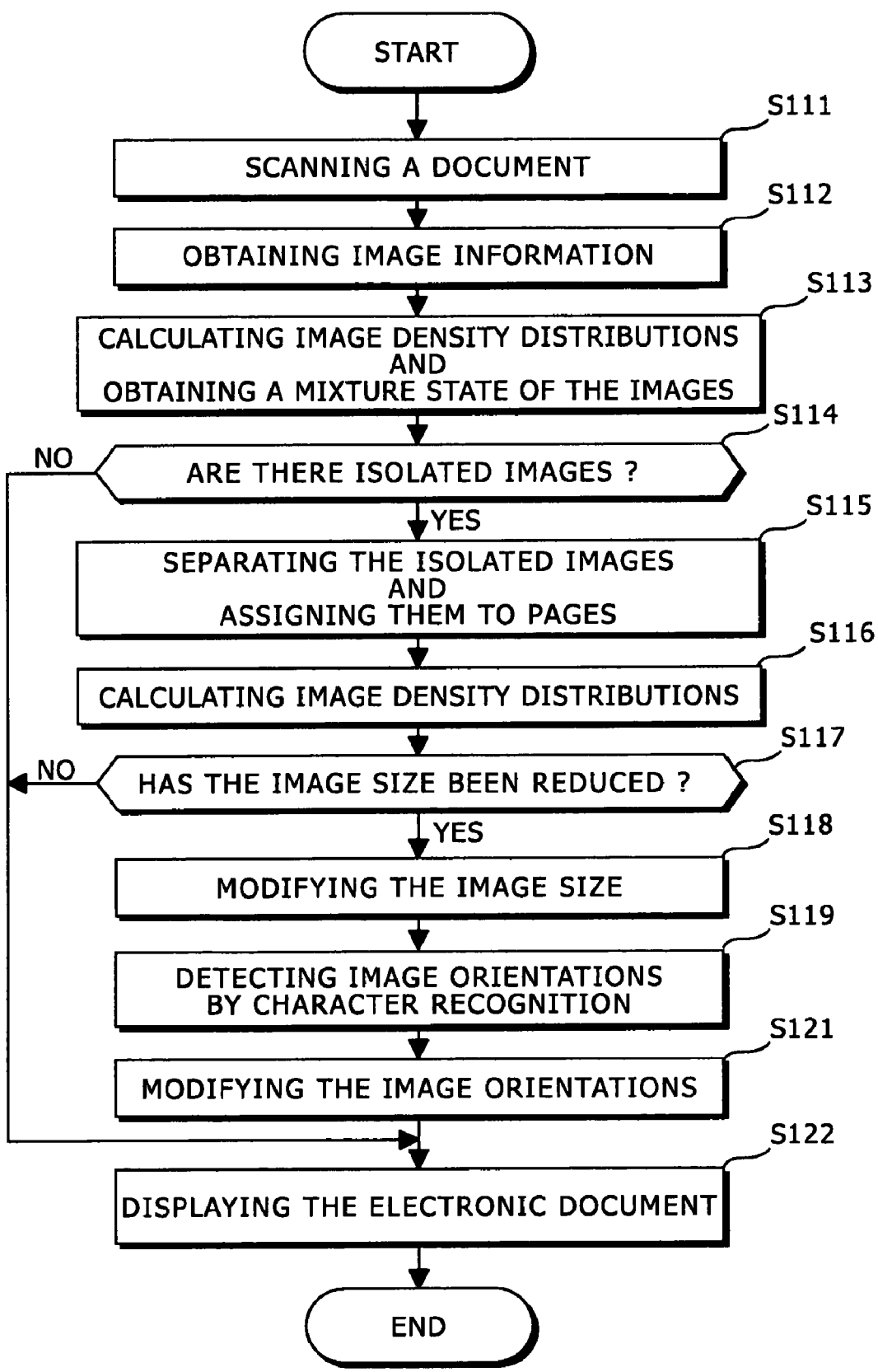
FIG. 7 shows a flowchart that indicates operations of the digital multi function peripheral according to Embodiment 2 of this invention.
Figure 8:
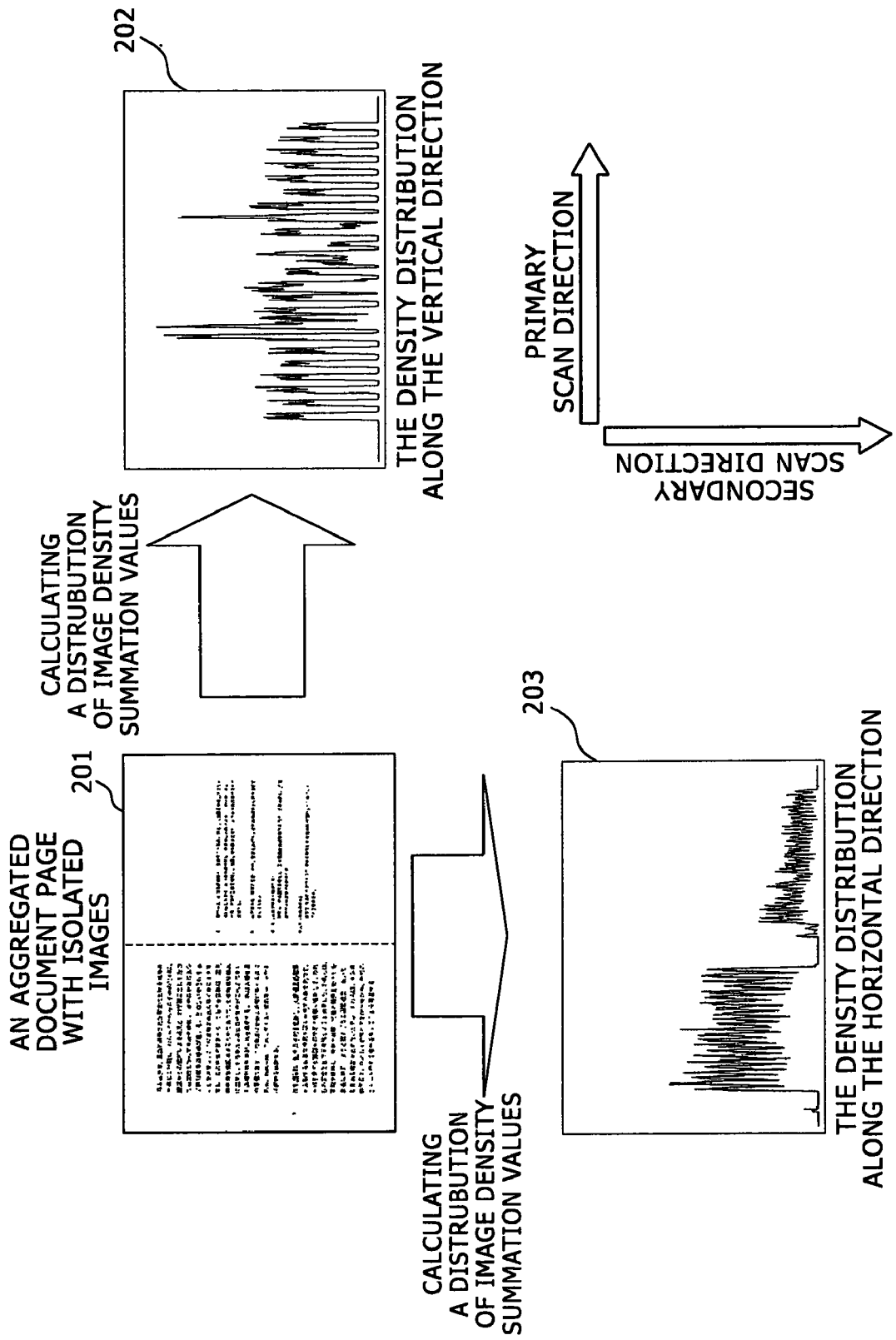
FIG. 8 shows a diagram for explaining image density distributions of an aggregated document page that contains isolated images.
Figure 10:
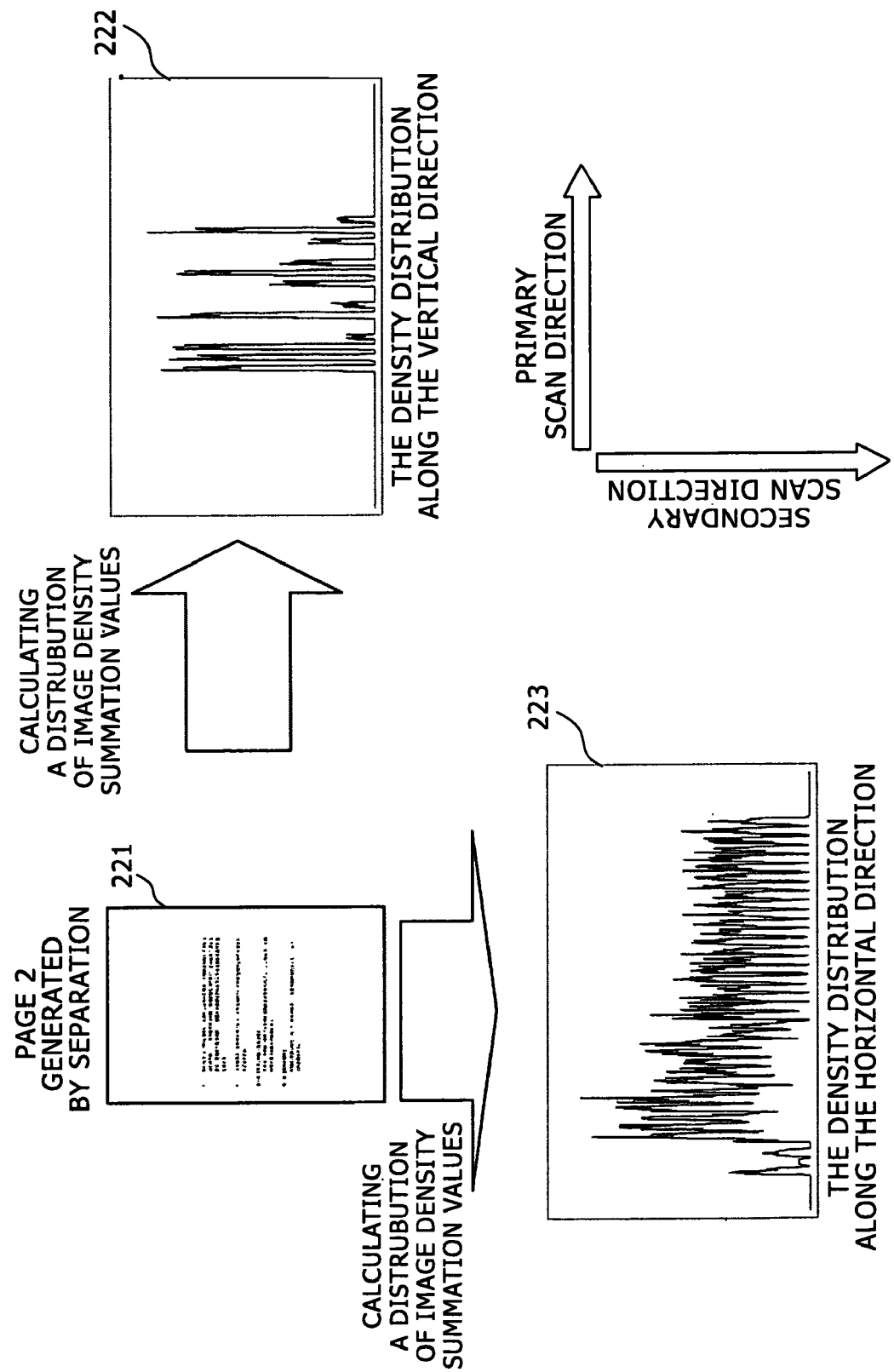
FIG. 10 shows a diagram for explaining image density distributions of a separated document page.

In the following part, operation of the digital multi function peripheral in Embodiment 2 is explained with referencing to FIGS. 7 to 11. FIG. 7 shows a flowchart that indicates operations of this digital multi function peripheral. FIG. 8 shows a diagram for explaining image density distributions of an aggregated document page that contains isolated images. FIG. 9 shows a diagram for explaining separation and orientation modification of the isolated images, based on a blank area in the aggregated document page. FIG. 10 shows a diagram for explaining image density distributions of a separated document page. FIG. 11 shows a diagram for explaining separation, enlargement and orientation modification of the aggregated document page.

Here, it is assumed that the digital multi function peripheral of Embodiment 2 has a page aggregation function, and an electronic document generation function for generating an electronic document that has document images of pages by using the page aggregation function.

As shown in FIG. 7, a user puts a document with pluralities of pages on an auto document feeder (not shown) in the document scanning unit 21, and operates the operation panel unit 51 to input an instruction for scanning the document, and then the main control unit 11 provides a start signal to the document scanning unit 21 to start scanning. Upon receiving the signal, the document scanning unit 21 starts scanning respective ones of the pages in the document (Step S111).

The document scanning unit 21 provides respective pieces of image data corresponding to respective ones of the pages scanned in Step S111 to the image information obtaining unit 71. The image information obtaining unit 71 receives the pieces of the image data corresponding to the pages of the document, and stores the image data in the image memory 37 (Step S112).

The image density distribution calculating unit 73 calculates image density distributions in a primary scan direction and a secondary scan direction based on the image data obtained by the image information obtaining unit 71, and then the mixture state identifying unit 75 identifies a mixture state of isolated images in the page from the image density distributions calculated by the image density distribution calculating unit 73 (Step S113).

Here, calculating the image density distributions and identifying the mixture state in Step S113 are explained in detail with an example of an aggregated document page that contains isolated images. An aggregated document page 201 in FIG. 8 has a horizontal text in the upright orientation in the vertical left area half of the page, and a horizontal text in the upright orientation in the vertical right half area of the page. In the left half, the horizontal text covers most of all the left half area. In the right half, the horizontal text is placed between upper and lower blank areas that occupy about two thirds of all the right half area. The image density distribution calculating unit 73 calculates respective summation values of image density for rows along the primary scan direction of the page, and obtains the image density distribution 202 in the secondary scan direction by arranging these summation values along the secondary scan direction. The image density distribution calculating unit 73 also calculates respective summation values of image density for columns along the secondary scan direction of the page, and obtains the image density distribution 203 in the primary scan direction by arranging these summation values along the primary scan direction. Analyzing characteristics of the image density distributions, it is found that the distribution 202 in the secondary scan direction (i.e. the vertical direction of the aggregated document page 201) has significant summation values in most of all range, but the distribution 203 in the primary scan direction (i.e. the horizontal direction of the aggregated document page 201) has a blank gap larger than a predetermined width at the center of the page. This blank gap means that the aggregated document page 201 contains a blank area. Therefore, it is found that the page 201 contains at least two isolated images on both sides of the blank area. Thus, the mixture state identifying unit 75 identifies the mixture state by analyzing the image density distributions 202 and 203 in the primary scan direction and the secondary scan direction. The mixture state indicates that how many (i.e. the value of "N" of "N in 1") isolated images the aggregated document page 201 contains.

From the mixture state identified in Step S113, the mixture state identifying unit 75 determines whether or not the page contains isolated images (Step S114).

If in Step S114 it is determined that the page does not contain isolated images, then for the page, processes in Steps S115 to S121 are skipped.

Otherwise, if it is determined that the page contains isolated images, then the isolated-image separating unit 77 separates the isolated images from a whole page image of the aggregated document page according to the mixture state identified by the mixture state identifying unit 75, and assigns the isolated images to new pages, respectively (Step S115).

An aggregated document page 211 in FIG. 9 has a horizontal text in the upright orientation in the vertical left half area as Page 1-1, and a horizontal text in the upright orientation in the vertical right half area as Page 1-2. In the left half, the horizontal text covers most of all the left half area. In the right half, the horizontal text is placed between upper and lower blank areas that occupy about two thirds of all the right half area. In FIG. 9, by separating the isolated images and assigning them to the new pages in Step S115, an aggregated document page 211 is converted to document pages 212 that contain the isolated images into which the page 211 is divided equally at a dashed line shown in FIG. 9.

As a result, the mixture of the isolated images dissolves, but large blank areas appear in the page due to the size of the isolated image smaller than the page, and the isolated image may be too small to see. Therefore, in Steps S116 to S121, if only a small isolated image is assigned to a page, then the isolated image is enlarged when an orientation of the isolated image is set as the upright orientation.

As well as in Step S113, in Step S116, the image density distribution calculating unit 73 calculates image density distributions in a primary scan direction and a secondary scan direction from the image data of the isolated image separated by the isolated-image separating unit 77.

From the image density distributions calculated in Step S116, the image size identifying unit 180 identifies the size of the isolated image, and determines whether or not the size of the isolated image is smaller than a predetermined threshold corresponding to the size of the page (that is, whether or not the isolated image is easy to see) (Step S117).

If in Step S117 it is determined that the isolated image is easy to see, then processes in Steps S118 to S121 are skipped.

Otherwise, if in Step S117 it is determined that the isolated image is not easy to see, then the image modifying unit 181 modifies the image data to enlarge the isolated image according to the size of the isolated image identified by the image size identifying unit 180, for example, to a predetermined percentage of the area of the page (Step S118).

Here, calculating the image density distributions in Step S116, identifying the image size in Step S117, and modifying the image size in Step S118 are explained in detail with Page 2 of the document 212 shown in FIG. 9 after separation. A document page 221 in FIG. 10 is Page 2 of the document 212. This page is a vertical page, and has a horizontal text in the upright orientation. The horizontal text is placed between upper and lower blank areas that occupy about two thirds of all area in the page. The image density distribution calculating unit 73 calculates respective summation values of image density for rows along the primary scan direction of the page, and obtains the image density distribution 222 in the secondary scan direction by arranging these summation values along the secondary scan direction. The image density distribution calculating unit 73 also calculates respective summation values of image density for columns along the secondary scan direction of the page, and obtains the image density distribution 223 in the primary scan direction by arranging these summation values along the primary scan direction. Analyzing characteristics of the image density distributions 222 and 223, it is found that the distribution 223 in the primary scan direction (i.e. the horizontal direction of the document page 221) has significant summation values in most of all range from an end to another end, but the distribution 222 in the secondary scan direction (i.e. the vertical direction of the document page 221) has significant summation values only in the center part, and has blank ranges near both ends of all range. The blank ranges in the distribution mean that the document page contains blank areas, and therefore it is found that an isolated image exists between the large blank areas. By rotating the page with the isolated image by 90 degrees, the isolated image in the vertical orientation is assigned to a horizontal page, and the isolated image is placed at/near the center of the horizontal document page. In the horizontal document page, blank areas appear as sizes corresponding to the blank ranges in the distribution calculated in Step S116. Therefore, a modification process enlarges the isolated image to cover the blank areas.

After the modification process of enlarging the image size in Step S118, the image orientation identifying unit 79 identifies an orientation of the isolated image from a result of character recognition for the isolated image (Step S119). The orientation is identified as any of 0, 90, 180 and 270 degrees.

The image modifying unit 181 sets the orientation of the isolated image as the upright orientation according to the orientation obtained by the image orientation identifying unit 79 (Step S121). In Step S121, if the long side direction of the isolated image is not identical to the long side direction of the page, then the page is rotated to make both of the directions identical. The image modifying unit 181 provides the electronic document to the display control unit 83 after the modification. The display control unit 83 causes the touch panel unit 53 to display images in the electronic document (Step S122). Consequently, a series of the processes ends.

In FIG. 11, by the enlargement and the modification to the upright orientation of the isolated image in Steps S116 to S121, an aggregated document page 231 (as same as the aggregated document page 221 in FIG. 9) is converted to document pages 232 that contain the isolated images into which the page 231 is divided equally at a dashed line shown in FIG. 11. Page 2 of the pages 232 has been rotated by 90 degrees, and the isolated image in Page 2 has been enlarged and rotated to be in the upright orientation. As a result, the document pages 232 are changed to pages that a user comfortably browses.

[Advantages of Embodiment 2]

As mentioned above, in Embodiment 2, image density distributions in primary and secondary scan directions are calculated from image data of the separated isolated image; the size of the separated isolated image is identified from the image density distributions; the orientation of the isolated image is identified from a result of character recognition based on the image data of the separated isolated image; and then a modification based on the size and the orientation of the isolated image is performed for enlarging the isolated image and rotating the isolated image to be in the upright orientation. Consequently, it is possible to provide a conformable browsing environment for an electronic document by saving user's work even if the electronic document is made using page aggregation, and contains the small isolated image not easy to see.

The description of the present invention has been presented for purposes of illustration and description, and is not intended to be exhaustive or limited to the invention in the form disclosed. Many modifications and variations will be apparent to those of ordinary skill in the art.

In Embodiments 1 and 2, after rotating the isolated images in different orientations to be in their upright orientations, images of the electronic document are displayed in the touch panel unit 53. Alternatively, for example, after rotating the isolated images, the electronic document may be stored in a document box of the digital multi function peripheral, or may be transferred to another machine.

What is claimed is:

1. An image processing method, comprising the steps of:
   scanning respective pages of a document in an image processing apparatus;
   generating respective pieces of image data corresponding to the pages in a processor of said image processing apparatus;
   calculating, in said image processing apparatus, image density distributions in a primary scan direction and a secondary scan direction in each of the pages from the image data;
   determining, in said image processing apparatus, whether or not each of the pages contains isolated images that have different orientations according to the image density distributions;
   assigning, in said image processing apparatus, respective ones of the isolated images to new pages;
   identifying, in said image processing apparatus, respective orientations of the isolated images according to a result of character recognition for the image data; and
   setting respective orientations, in said image processing apparatus, of the isolated images in the new pages as respective upright orientations of the isolated images,
   calculating, in said image processing apparatus, respective summation values of image density for rows along the primary scan direction of the page, and obtaining the image density distribution in the secondary scan direction by arranging these summation values along the secondary scan direction;
   calculating, in said image processing apparatus, respective summation values of image density for columns along the secondary scan direction of the page, and obtaining the image density distribution in the primary scan direction by arranging these summation values along the primary scan direction;
   detecting, in said image processing apparatus, a blank area between the isolated images from the image density distributions of the primary scan direction and the secondary scan direction; and
   determining, in said image processing apparatus, that the page contains isolated images, if the blank area is detected.

2. An image processing apparatus, comprising:
   a document scanning unit that scans respective pages in a document;
   an image data generating unit that generates respective pieces of image data corresponding, to the pages;
   an image density distribution calculating unit that calculates image density distributions in a primary scan direction and a secondary scan direction in each of the pages from the image data;
   a mixture state identifying unit that identifies a mixture state from the image density distributions, the mixture state indicating whether or not each of the pages contains isolated images that have different orientations;
   an isolated-image separating unit that assigns respective ones of the isolated images to new pages according to the mixture state; and
   an image orientation identifying unit that identifies respective orientations of the isolated images according to a result of character recognition for the image data; and
   an image orientation modifying unit that sets respective orientations of the isolated images in the new pages as respective upright orientations of the isolated images wherein:
   the image density distribution calculating unit calculates respective summation values of image density for rows along the primary scan direction of the page, and obtains the image density distribution in the secondary scan direction by arranging these summation values along the secondary scan direction, and calculates respective summation values of image density for columns along the secondary scan direction of the page, and obtains the image density distribution in the primary scan direction by arranging these summation values along the primary scan direction; and
   the mixture state identifying unit detects a blank area between the isolated images from the image density distributions of the primary scan direction and the secondary scan direction, and determines that the page contains isolated images, if the blank area is detected.

3. The image processing apparatus according to claim 2, wherein:

a display unit that displays an electronic document that contains an image of the document according to the image data.

4. An image processing method, comprising the steps of:

scanning respective pages of a document in an image processing apparatus;

generating respective pieces of image data corresponding, to the pages in a processor of said image processing apparatus;

calculating, in said image processing apparatus, image density distributions in a primary scan direction and a secondary scan direction in each of the pages from the image data;

determining, in said image processing apparatus, whether or not each of the pages contains isolated images from the image density distributions;

assigning, in said image processing, apparatus, respective ones of the isolated images to new pages;

identifying, in said image processing apparatus, sizes of the isolated images from the image density distributions;

identifying, in said image processing apparatus, respective orientations of the isolated images according to a result of character recognition for the image data;

setting, in said image processing apparatus, respective orientations of the isolated images in the new pages as respective upright orientations of the isolated images; and enlarging, in said image processing apparatus, the isolated images in the new pages according to the sizes of the isolated images calculating, in said image processing apparatus, respective summation values of image density for rows along the primary scan direction of the page, and obtaining the image density distribution in the secondary scan direction by arranging these summation values along the secondary scan direction;

calculating, in said image processing apparatus, respective summation values of image density for columns along the secondary scan direction of the page, and obtaining the image density distribution in the primary scan direction by arranging these summation values along the primary scan direction;

detecting, in said image processing apparatus, a blank area between the isolated images from the image density distributions of the primary scan direction and the secondary scan direction; and determining, in said image processing apparatus, that the page contains isolated images, if the blank area is detected.

5. An image processing method, comprising the steps of:

scanning respective pages of a document in an image processing apparatus;

generating respective pieces of image data corresponding to the pages in a processor of said image processing apparatus;

calculating, in said image processing apparatus, image density distributions in a primary scan direction and a secondary scan direction in each of the pages from the image data;

determining, in said image processing apparatus, whether or not each of the pages contains isolated images from the image density distributions;

assigning, in said image processing apparatus, respective ones of the isolated images to new pages;

identifying, in said image processing apparatus, sizes of the isolated images from the image density distributions;

identifying, in said image processing apparatus, respective orientations of the isolated images according to a result of character recognition for the image data;

setting, in said image processing apparatus, respective orientations of the isolated images in the new pages as respective upright orientations of the isolated images; and enlarging, in said image processing apparatus, the isolated images in the new pages according to the sizes of the isolated images calculating, in said image processing apparatus, respective summation values of image density for rows along the primary scan direction of the page, and obtaining the image density distribution in the secondary scan direction by arranging these summation values along the secondary scan direction;

calculating, in said image processing apparatus, respective summation values of image density for columns along the secondary scan direction of the page, and obtaining the image density distribution in the primary scan direction by arranging these summation values along the primary scan direction;

detecting, in said image processing apparatus, a blank area in the primary scan direction and/or the secondary scan direction from the image density distributions; and identifying, in said image processing apparatus, the sizes of the isolated images from the blank area.

6. An image processing apparatus, comprising:

a document scanning unit that scans respective pages in a document;

an image data generating unit that generates respective pieces of image data corresponding to the pages;

an image density distribution calculating unit that calculates image density distributions in a primary scan direction and a secondary scan direction in each of the pages from the image data;

a mixture state identifying unit that identifies a mixture state from the image density distributions, the mixture state indicating whether or not each of the pages contains isolated images;

an isolated-image separating unit that assigns respective ones of the isolated images to new pages according to the mixture state; and an image size identifying unit that identifies sizes of the isolated images from the image density distributions;

an image orientation identifying unit that identifies respective orientations of the isolated images according to a result of character recognition for the image data; and an image modifying unit that sets respective orientations of the isolated images in the new pages as respective upright orientations of the isolated images, and enlarges the isolated images in the new pages according to the sizes of the isolated images wherein:

the image density distribution calculating unit calculates respective summation values of image density for rows along the primary scan direction of the page, and obtains the image density distribution in the secondary scan direction by arranging these summation values along the secondary scan direction, and calculates respective summation values of image density for columns along the secondary scan direction of the page, and obtains the image density distribution in the primary scan direction by arranging these summation values along the primary scan direction; and the mixture state identifying unit detects a blank area between the isolated images from the image density distributions of the primary scan direction and the secondary scan direction, and determines that the page contains isolated images, if the blank area is detected.

7. An image processing apparatus, comprising:
a document scanning unit that scans respective pages in a document;
an image data generating unit that generates respective pieces of image data corresponding to the pages;
an image density distribution calculating unit that calculates image density distributions in a primary scan direction and a secondary scan direction in each of the paces from the image data;
a mixture state identifying unit that identifies a mixture state from the image density distributions, the mixture state indicating whether or not each of the pages contains isolated images;
an isolated-image separating unit that assigns respective ones of the isolated images to new pages according to the mixture state; and
an image size identifying unit that identifies sizes of the isolated images from the image density distributions;
an image orientation identifying unit that identifies respective orientations of the isolated images according to a result of character recognition for the image data; and
an image modifying unit that sets respective orientations of the isolated images in the new pages as respective upright orientations of the isolated images, and enlarges the isolated images in the new pages according to the sizes of the isolated images wherein:

the image density distribution calculating unit calculates respective summation values of image density for rows along the primary scan direction of the page, and obtains the image density distribution in the secondary scan direction by arranging these summation values along the secondary scan direction, and calculates respective summation values of image density for columns along the secondary scan direction of the page, and obtains the image density distribution in the primary scan direction by arranging these summation values along the primary scan direction; and the image size identifying unit detects a blank area in the primary scan direction and/or the secondary scan direction from the image density distributions, and identifies the sizes of the isolated images from the blank area.

8. The image processing apparatus according to claim 6, further comprising:
a display unit that displays an electronic document that contains image of the document according to the image data.

9. The image processing apparatus according to claim 7, further comprising:
a display unit that displays an electronic document that contains image of the document according to the image data.

* * * * *